(12) United States Patent
Kasriel et al.

(10) Patent No.: US 7,962,594 B2
(45) Date of Patent: *Jun. 14, 2011

(54) DELIVERING CONTENT ON A NETWORK USING DIFFERENTIAL CACHING SYSTEM AND METHOD

(75) Inventors: Stephane Kasriel, San Francisco, CA (US); Walter Mann, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/679,158

(22) Filed: Feb. 26, 2007

(65) Prior Publication Data

US 2007/0198687 A1 Aug. 23, 2007

Related U.S. Application Data

(63) Continuation of application No. 09/888,374, filed on Jun. 22, 2001, now Pat. No. 7,185,063.

(51) Int. Cl.
*G06F 15/173* (2006.01)
*G06F 15/16* (2006.01)

(52) U.S. Cl. .................. 709/223; 709/217; 709/224

(58) Field of Classification Search .......... 709/223–224, 709/203, 217
See application file for complete search history.

(56) References Cited

U.S. PATENT DOCUMENTS

| | | | |
|---|---|---|---|
| 5,680,634 A | 10/1997 | Estes | |
| 5,727,129 A | 3/1998 | Barrett et al. | |
| 5,728,129 A | 3/1998 | Summers | |
| 5,774,660 A | 6/1998 | Brendel | |
| 5,802,292 A | 9/1998 | Mogul | |
| 5,826,258 A | 10/1998 | Gupta | |
| 5,835,712 A | 11/1998 | DuFresne | |

(Continued)

FOREIGN PATENT DOCUMENTS

DE 010146356 4/2003

(Continued)

OTHER PUBLICATIONS

Delphion Intellectual Property Network to search. "Weclome to the new world of IP Information, Delphion". 1997-2001 Delphion Inc. <URL:http/www.delphion.com>.

(Continued)

*Primary Examiner* — Hussein A Elchanti
(74) *Attorney, Agent, or Firm* — North Oaks Patent Agency; Shawn B. Dempster; Lynn M. Holly (57) ABSTRACT

A system and method for delivering content on a network using differential caching is described. A request for information is received from a request-generating element coupled to a browser associated with a client through the network. A static portion and a dynamic portion of a document to be included in a response as the requested information are identified based on previously cached information by utilizing a software element that is not part of the client. The static portion is cached in a memory that is logically local to the client that requested the information. The static portion is served to the request-generating element from the cached memory. The dynamic portion is served to the request-generating element from the network. The static portion and the dynamic portion are integrated using the request-generating element into the document included in the response to the browser as the requested information.

22 Claims, 3 Drawing Sheets

U.S. PATENT DOCUMENTS

| | | | | |
|---|---|---|---|---|
| 5,845,088 | A | 12/1998 | Lewis | |
| 5,859,971 | A | 1/1999 | Bigginger | |
| 5,870,546 | A | 2/1999 | Kirsch | |
| 5,878,223 | A | 3/1999 | Becker | |
| 5,878,429 | A | 3/1999 | Morris | |
| 5,931,904 | A | 8/1999 | Banga | |
| 5,944,790 | A | 8/1999 | Levy | |
| 5,978,841 | A | 11/1999 | Berger | |
| 5,983,227 | A | 11/1999 | Nazem | |
| 5,987,480 | A | 11/1999 | Donahue | |
| 6,003,087 | A | 12/1999 | Housel | |
| 6,021,426 | A | 2/2000 | Douglis | |
| 6,026,413 | A | 2/2000 | Challenger | |
| 6,061,715 | A | 5/2000 | Hawes | |
| 6,067,565 | A | 5/2000 | Horvitz | |
| 6,085,193 | A | 7/2000 | Malkin | |
| 6,094,662 | A * | 7/2000 | Hawes | 707/104.1 |
| 6,098,152 | A | 8/2000 | Mounes-Toussi | |
| 6,112,242 | A | 8/2000 | Josi | |
| 6,128,655 | A | 10/2000 | Fields et al. | |
| 6,138,251 | A | 10/2000 | Murphy | |
| 6,144,990 | A | 11/2000 | Brandt | |
| 6,154,767 | A | 11/2000 | Altschuler | |
| 6,178,461 | B1 | 1/2001 | Chan et al. | |
| 6,192,382 | B1 | 2/2001 | Lafer et al. | |
| 6,216,212 | B1 | 4/2001 | Challenger | |
| 6,249,795 | B1 | 6/2001 | Douglis | |
| 6,249,844 | B1 * | 6/2001 | Schloss et al. | 711/122 |
| 6,256,712 | B1 | 7/2001 | Challenger | |
| 6,260,192 | B1 | 7/2001 | Rosin | |
| 6,263,352 | B1 | 7/2001 | Cohen | |
| 6,314,465 | B1 | 11/2001 | Paul | |
| 6,327,628 | B1 | 12/2001 | Anuff | |
| 6,343,318 | B1 | 1/2002 | Hawkins | |
| 6,374,305 | B1 | 4/2002 | Gupta | |
| 6,377,978 | B1 | 4/2002 | Nguyen | |
| 6,397,217 | B1 | 5/2002 | Melbin | |
| 6,405,252 | B1 | 6/2002 | Gupta | |
| 6,430,624 | B1 | 8/2002 | Jamtgaard et al. | |
| 6,453,319 | B1 | 9/2002 | Mattis | |
| 6,457,103 | B1 | 9/2002 | Challenger et al. | |
| 6,466,937 | B1 | 10/2002 | Fascenda | |
| 6,466,970 | B1 | 10/2002 | Lee et al. | |
| 6,523,063 | B1 * | 2/2003 | Miller et al. | 709/206 |
| 6,553,413 | B1 | 4/2003 | Leighton et al. | |
| 6,560,604 | B1 | 5/2003 | Fascenda | |
| 6,605,120 | B1 | 8/2003 | Fields et al. | |
| 6,606,525 | B1 * | 8/2003 | Muthuswamy et al. | 700/52 |
| 6,623,529 | B1 | 9/2003 | Larkritz | |
| 6,629,138 | B1 | 9/2003 | Lambert | |
| 6,697,844 | B1 | 2/2004 | Chan | |
| 6,704,024 | B2 | 3/2004 | Robotham | |
| 6,721,780 | B1 | 4/2004 | Kasriel | |
| 6,728,785 | B1 | 4/2004 | Jungck | |
| 6,760,746 | B1 | 7/2004 | Schneider | |
| 6,792,475 | B1 | 9/2004 | Arcuri et al. | |
| 6,826,553 | B1 | 11/2004 | DaCosta et al. | |
| 6,826,614 | B1 * | 11/2004 | Hanmann et al. | 709/227 |
| 6,826,626 | B1 | 11/2004 | McManus | |
| 6,857,012 | B2 * | 2/2005 | Sim et al. | 709/222 |
| 6,859,910 | B2 * | 2/2005 | Croy | 715/205 |
| 6,868,453 | B1 | 3/2005 | Watanabe | |
| 6,873,877 | B1 | 3/2005 | Tobias et al. | |
| 6,879,998 | B1 | 4/2005 | Raciborski et al. | |
| 6,892,189 | B2 | 5/2005 | Quass et al. | |
| 6,910,073 | B2 | 6/2005 | Banga et al. | |
| 6,912,591 | B2 | 6/2005 | Lash | |
| 6,944,817 | B1 | 9/2005 | Danneels | |
| 7,055,094 | B2 | 5/2006 | Imielinski et al. | |
| 7,058,700 | B1 | 6/2006 | Casalaina | |
| 7,072,849 | B1 | 7/2006 | Filepp et al. | |
| 7,072,987 | B2 | 7/2006 | Jurisch | |
| 7,092,977 | B2 | 8/2006 | Leung | |
| 7,092,997 | B1 | 8/2006 | Kasriel | |
| 7,096,418 | B1 * | 8/2006 | Singhal et al. | 715/205 |
| 7,194,682 | B2 | 3/2007 | Warrington | |
| 7,483,955 | B2 * | 1/2009 | Gupta et al. | 709/209 |
| 7,502,858 | B2 * | 3/2009 | Gupta et al. | 709/226 |
| 2001/0037361 | A1 | 11/2001 | Croy | |
| 2001/0037400 | A1 | 11/2001 | Raz | |
| 2001/0056460 | A1 | 12/2001 | Sahota et al. | |
| 2002/0004813 | A1 * | 1/2002 | Agrawal et al. | 709/201 |
| 2002/0032677 | A1 | 3/2002 | Morgenthaler et al. | |
| 2002/0048450 | A1 | 4/2002 | Zetts | |
| 2002/0056010 | A1 | 5/2002 | Lincoln et al. | |
| 2002/0062384 | A1 | 5/2002 | Tso | |
| 2002/0138509 | A1 | 9/2002 | Burrows | |
| 2002/0138511 | A1 | 9/2002 | Psounis | |
| 2002/0161860 | A1 | 10/2002 | Godlin | |
| 2003/0009563 | A1 | 1/2003 | Douglis | |
| 2003/0110186 | A1 | 6/2003 | Markowski | |
| 2003/0110296 | A1 | 6/2003 | Kirsch et al. | |
| 2003/0120752 | A1 | 6/2003 | Corcoran | |
| 2003/0154261 | A1 | 8/2003 | Doyle et al. | |
| 2004/0128346 | A1 | 7/2004 | Melamed | |
| 2004/0172458 | A1 | 9/2004 | Pitts | |
| 2004/0205165 | A1 | 10/2004 | Melamed | |
| 2006/0168118 | A1 | 7/2006 | Godlin et al. | |
| 2006/0168348 | A1 | 7/2006 | Casalaina | |

FOREIGN PATENT DOCUMENTS

| | | |
|---|---|---|
| EP | 001662405 | 5/2006 |
| JP | 02003132086 | 5/2003 |
| WO | 0028433 A2 | 5/2000 |
| WO | 0028433 A3 | 5/2000 |
| WO | 02054258 | 7/2002 |

OTHER PUBLICATIONS

"How Web Servers and the Internet Work," Marshall Brian, How Stuff Works, obtained at Internet address <http://www.howstuffworks.com/web-server.htm>.

"Scalable Web Clusters with Static and Dynamic Contents", Casalicchio E. Colajanni, M., IEEE International Proceedings on Conference Cluster Computing, pp. 170-177, Nov. 2000.

Intelligent Prefetch in WWW Using Client Behavior Characterization Swaminathan, N. Raghavan, S.V., International Symposium on Modeling, Analysis and Simulation of Computer and Telecommunication Systems, pp. 13-19, Sep. 2000.

A Schema-Based Approach to Web Engineering, Kuhnke, C. Schneeberger, J. Turk, A., System Sciences, Schema Electronic Documentation Solutions p. 10, Jan. 2000.

A Survey of Web Caching Schemes for the Internet: ACM SIGCOMM Computer Communication Review, pp. 36-46, Oct. 1999.

Client-Server Computing in Mobile Environment, Jin Jing. Abdelsalam Helal and Ahmed Elmagarmid, ACM Computing Surveys, vol. 31 No. 2, Jun. 1999.

Active Cache: caching dynamic contents on the Web, Pei Cao, Jin Zhang and Kevin Beach, The British Computer Society, The Institution of Electrical Engineers & IOP Publishing Ltd., 1999.

Goulde, M., Network Caching Guide: Optimizing Web Content Delivery, Boston, MA, Patricia Seybold Group, Mar. 1999, pp. i-42.

Mogul, J. et al, "HTTP Delta Clusters and Templates", Aug. 24, 2000. draft-mogul-http-dcluster-00.txt.

Accomazzi, A. "rproxy", 1999-2001 By Martin Pool.

U.S. Appl. No. 09/734,910, filed Dec. 11, 2000, Kasriel.
U.S. Appl. No. 09/827,268, filed Apr. 4, 2001, Kasriel.
U.S. Appl. No. 09/888,374, filed Jun. 22, 2001, Kasriel.
U.S. Appl. No. 09/923,292, filed Aug. 6, 2001, Kasriel.
U.S. Appl. No. 09/923,809, filed Aug. 7, 2001, Kasriel.
U.S. Appl. No. 10/058,232, filed Oct. 19, 2001, Kasriel.
U.S. Appl. No. 10/079,932, filed Feb. 19, 2002, Kasriel.
U.S. Appl. No. 10/082,493, filed Feb. 22, 2002, Kasriel.

* cited by examiner

DELIVERING CONTENT ON A NETWORK USING DIFFERENTIAL CACHING SYSTEM AND METHOD

RELATED APPLICATIONS

This application is a Continuation Application of U.S. application Ser. No. 09/888,374, filed Jun. 22, 2001, entitled "Content Delivery Network Using Differential Caching," now issued as U.S. Pat. No. 7,185,063 on Feb. 27, 2007.

This application is related to the following patent and copending applications:

- U.S. patent application Ser. No. 09/436,136, entitled "Predictive Pre-Download of Network Objects," issued as U.S. Pat. No. 6,721,780 on Apr. 13, 2004;
- U.S. patent application Ser. No. 09/734,910, filed Dec. 11, 2000, entitled "Predictive Pre-Download Using Normalized Network Objects Identifiers," issued as U.S. Pat. No. 6,981,017 on Dec. 27, 2005;
- U.S. patent application Ser. No. 09/827,268, filed Apr. 4, 2001, entitled "Server-Originated Differential Caching";

Each of these applications is hereby incorporated by reference as if fully set forth herein. They are collectively referred to as the "incorporated disclosures".

FIELD OF THE INVENTION

This invention relates to a content delivery network using differential caching.

BACKGROUND OF THE INVENTION

When multiple users (at client devices) request information from a server (at a server device), it often occurs that the number of requests from client devices taxes the server device, and reduces the quality of service that each user experiences. Moreover, when those multiple client devices are distributed at widely disparate locations, there is reduced quality of service experienced by users relatively distant from the server device, due to distance (either measured physically or measured by a communication network topology) that messages travel. Accordingly, it would be advantageous to provide additional server devices having the same content for delivery to client devices, to (1) share the load of requests made to the server device, and to (2) move the content for delivery closer to client devices. Each of these effects should improve the quality of service experienced by client devices.

One known method is to provide a content delivery network, including an originating server device and a set of mirroring server devices, disposed so that original content from the originating server is delivered and maintained at each of the mirroring servers. While this known method generally achieves the goal of moving content for delivery closer to client devices, it has the drawback that it is relatively unsuitable for content that is not static. When the content for delivery is dynamically changing, or is personalized for users at different client devices, the content is not static, and the mirroring servers cannot guarantee that they have the correct content for delivery. The content delivery network thus is relatively unsuitable for responding to requests for non-static content.

Accordingly, it would be desirable to provide a technique for serving relatively non-static content for delivery in a content delivery network.

SUMMARY OF THE INVENTION

The invention provides a method and system for serving relatively non-static content for delivery in a content delivery network. Content for delivery is pushed out from an originating server to a set of mirroring servers using differential caching. Using differential caching, each object that might be requested by a client is separated into template information and delta information. In a preferred embodiment, the originating server determines a set of templates for differential caching, and causes those templates to be distributed using the content delivery network to the mirroring servers. Each mirroring server in the content delivery network is able to access, either locally or by reference to a nearby distribution point, a copy of an applicable recent template for each request made by a client. Hosting of the template information is decoupled from hosting of the delta information.

Delta information can include (a) changes to the template information since last distributed using the content delivery network, or (b) personalized information specific to the client or to the request made by the client. In a preferred embodiment, delta information can be served separately from the originating server, or can be served separately from mirroring servers using a content distribution network (possibly the same content distribution network as used to serve template information).

Using differential caching with the content distribution network (that is, decoupling distribution of template information from distribution of delta information) allows the system to provide the following functions, not provided by known methods:

- The amount of bandwidth used to distribute changes to content from the originating server is minimized. This allows more content to be distributed using the same amount of bandwidth, or alternatively, reduces the cost of distributing the same amount of content.
- The content distribution network is able to distribute dynamically changing content with substantially less use of bandwidth, and with substantially greater responsiveness to the dynamic changes. The template information is sufficiently static for distribution using the content distribution network. Distribution of the delta information does not put an excessive burden on the originating server, or when the delta information is distributed using a content distribution network, does not put an excessive burden on the content distribution network.
- The content distribution network is able to distribute personalized content. As with dynamically changing content, the template information is sufficiently static for distribution using the content distribution network. Distribution of the delta information can be distributed from the same server or a different set of servers. For example, if personalized content requires a database lookup, the originating server or another server can perform primarily database lookups, while a separate mirroring system for the personalized information can distribute the delta information to clients in personalized form.
- There are many individual objects that might be included in a page that is specific to a particular client. While these individual objects are themselves typically very similar or even identical to objects to be included in pages specific to different clients, the selection of which individual objects to be included is responsive to personalized information about each client. Thus, distribution of the individual objects can be decoupled from personalization using those objects, just like distribution of the template information can be decoupled from distribution of delta information.

The invention can be used in conjunction with a known content distribution network, so as to allow the known content distribution network to provide both dynamic content and personalized content (when used in conjunction with the invention).

The invention has general applicability to content delivery, not limited specifically to the web pages, web protocols, or caching (and not limited specifically to content delivery as described herein). For example, embodiments of the invention can include one or more of, or some combination of, the following applications:

- distribution of databases responses, including responses to common or frequently used database queries;
- distribution of email and groupware messages, bulletin board or newsgroup messages; and
- distribution of streaming media content (template information and insertion points can be streamed from a content delivery network and delta information can be streamed from an originated server Moreover, techniques used by a preferred embodiment of the invention for content delivery can be used in contexts other than the specific applications disclosed herein. For example, techniques used by embodiments of the invention for content delivery are all generally applicable to fields other than the specific applications disclosed herein.

DETAILED DESCRIPTION

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

Lexicography client and server—as used herein, the phrases, "client" and "server" refer to a relationship between two devices, particularly to their relationship as client and server, not necessarily to any particular physical devices.

client device and server device—as used herein, the phrase "client device" includes any device taking on the role of a client in a client-server relationship (such as an HTTP web client and web server). There is no particular requirement that any client devices must be individual physical devices; they can each be a single device, a set of cooperating devices, a portion of a device, or some combination thereof. As used herein, the phrase "server device" includes any device taking on the role of a server in a client-server relationship. There is no particular requirement that server devices must be individual physical devices; they can each be a single device, a set of cooperating devices, a portion of a device, or some combination thereof.

logically remote—as used herein, the phrase "logically remote" refers to the relative logical placement or degree of connectivity between two or more computerized systems or two or more elements within a single system. Generally, elements that are relatively proximate to each other may be logically remote if there is a small probability that information will flow between them on a regular basis.

System Elements

Figure 1:
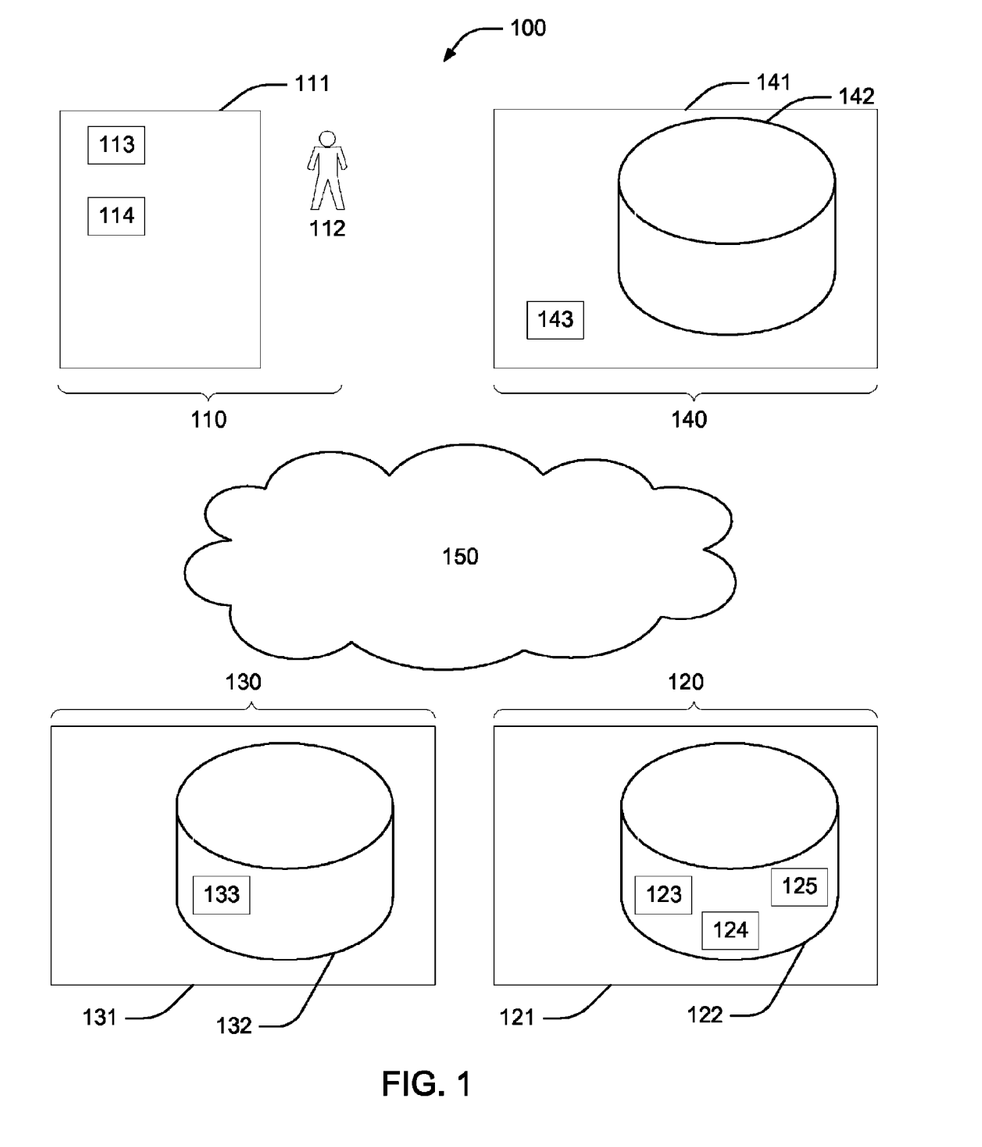
FIG. 1 shows a block diagram of a content delivery network using differential caching.

FIG. 1 shows a block diagram of a content delivery network using differential caching.

A system includes one or more clients 110, an originating server 120, a set of mirroring servers 130, a set of proxy encoder servers 140 and a communication network 150.

Client

Each client 110 includes a client workstation 111 and a client operator 112.

As described in the incorporated disclosures, a "workstation" might include a personal computer, a software package on a server, a handheld computer cooperating with a personal computer or with a server (or both), or a telephone interface to a system such as an interactive voice response system. There is also no particular requirement that multiple workstations used by a single client need be of the same type. Also as described in the incorporated disclosures, an "operator" might comprise an individual person, a set of persons having authority to act in particular way, a proxy for an individual person or set of persons, such as a human secretary or a computer program having the function of forwarding or aggregating or scheduling requests made by others, or even an artificial intelligence program such as an expert system or otherwise.

In a preferred embodiment, each client 110 includes a web browser 113, such as the "Internet Explorer" product or the "Netscape Navigator" product, capable of using a message transfer protocol, such as HTTP (hypertext transfer protocol), or a variant thereof, to request documents (such as for example web pages) from the originating server 120 or a mirroring server 130 and to receive documents and other responses from the originating server 120 or a mirroring server 130. A decoder 114 is coupled to the web browser 113, preferably as a browser add-on. However, in other embodiments, multiple decoders 114 may be situated relatively proximate to an Internet service provider, an enterprise cache or at other locations within the communications network 150.

In other embodiments, the browser 113 is not coupled to a decoder 114. In such embodiments, functions normally performed on the client side by the decoder 114 are performed by the browser 113 and the proxy encoder server 140. These embodiments are referred to as "clientless versions".

Originating Server

The originating server 120 includes a computer 121 and a database 122 of documents 123. In a preferred embodiment, documents 123 can include (as further described herein) web pages, embedded objects for web pages, template web pages, changed data for insertion into template web pages, and code fragments.

The originating server 120 includes a processor, program and data memory, and operates under control of software to perform the tasks described herein. In particular, the originating server 120 is capable of using a message transfer protocol, such as HTTP or a variant thereof, to receive requests for documents (such as for example web pages) from clients 110 and to respond to those requests by sending those documents to clients 110. In a preferred embodiment, the originating server 120 uses HTTP version 1.1, or at least some features thereof, as described herein.

Mirroring Servers

Similar to the originating server 120, the mirroring servers 130 each include a computer 131 and a database 132 of documents 133. Similar to the originating server 120, each mirroring server 130 includes a processor, program and data memory, and operates under control of software to perform the tasks described herein.

Proxy Encoder Servers

Similar to the originating server 120 and the mirroring servers 130, the proxy encoder servers 140 each include a computer 141 and a database 142 of documents 133 or template information 124. However, the proxy encoder server 140 also includes a software element 143 that recognizes a URL and transparently alters the URL so as to direct requests from the client 110 to the content delivery network. This software element 143 can also embed information in the URL such as may be relevant to which version of a web page or template information is transmitted, whether a decoder 114 can accept delta information 125 and other information that pertains to equipment or communication parameters.

In a preferred embodiment, the proxy encoder server 140 is relatively local to the originating server 120 and the mirroring servers 130. The encoder 140 may also be integrated inside an existing server component, such as any of the previously described servers, a web server, an application server, a cache or an L7 switch.

It would be clear to those skilled in the art, after perusal of this application, that the system can include more than one originating server 120, each disposed for originating a set of content for distribution (probably a completely different set of such content for distribution) to clients 110. Moreover, it would be clear to those skilled in the art, after perusal of this application, that at least some of the originating servers 120 can operate as mirroring servers 130 for other, different, originating servers 120, while at least some of the mirroring servers 130 can operate as originating servers 120 for their own specific content for distribution. All such variations and extensions of ideas presented herein are within the scope and spirit of the invention, and would not require either undue experimentation or invention when considered in view of this application.

Communication Network

Clients 110, originating servers 120 and mirroring servers 130 are coupled using a communication network 150. In a preferred embodiment, the communication network 150 includes a computer communication network, such as the Internet. However, in alternative embodiments, the communication network 150 might include an intranet, extranet, VPN (virtual private network), ATM system, a portion of a private or public PSTN (public switched telephone network), a frame relay system, or any other communication technique capable of performing the functions described herein.

Content Distribution

In a preferred embodiment, each mirroring server 130 performs a function much like a caching device. Each mirroring server 130 receives requests from clients 110, and determines whether (a) it can service those requests directly, or (b) it can service those requests by obtaining information from the originating server 120. When the mirroring server 130 can service those requests directly, it does so, sending content for delivery to the requesting client 110 in response to the request. When the mirroring server 130 can service those requests by obtaining information from the originating server 120, it does so, requesting the content from the originating server 120, and sending that content to the requesting client 110. The mirroring server 130 can determine whether to cache (or otherwise maintain) a copy of the content for delivery, so that later requesting clients 110 can be serviced without resort to a request to the originating server 120.

When maintaining a document 123 (such as a web page), the originating server 120 determines a set of template information 124 and a set of delta information 125. In a preferred embodiment, the template information 124 indicates those portions of the document 123 that are relatively static, while the delta information 125 indicates those portions of the document 123 that are relatively dynamic.

In a preferred embodiment, requests are made by the client 110 using the decoder 114. The decoder 114 forwards the request to the proxy encoder server 140, which in turn, transmits the request to the originating server 120. The original HTTP response is preferably altered so that additional information can be appended to it, such as whether template information 124 or an entire page was fetched, what version of the template information 124 was obtained and similar information pertaining to other communication parameters. This additional information can be used in subsequent requests, so as to determine the relative freshness of a page. The proxy encoder server 140 retrieves the document 123 and uses it to create an associated template 124. In this embodiment, the document 123 is integrated at either the client device 110 by the client 110 or at the proxy encoder server 140 (if the client device 110 does not accept delta information 125).

In another preferred embodiment, a request from a client 110 can be associated with delta information 125. The delta information 125 is associated with a pointer to a template 124 that is available, either through the content delivery network (if the template is available there) or at the originating server 120.

In an alternative embodiment, each mirroring server 130 maintains a copy of template information 124 for that particular document 123. When the document 123 is requested by a client 110, the mirroring server 130 can provide the template information 124 to the client 110 from its cache, while the client 110 obtains the delta information 125 from the originating server 120 (or from a content distribution network similarly disposed for distributing delta information 125). Sending the template information 124 from the originating server 120 to the mirroring servers 130 (and from the mirroring servers 130 to the decoder 114) is separate from sending the delta information 125 from the originating server 120 to the client 110.

Method of Operation

Figure 2:
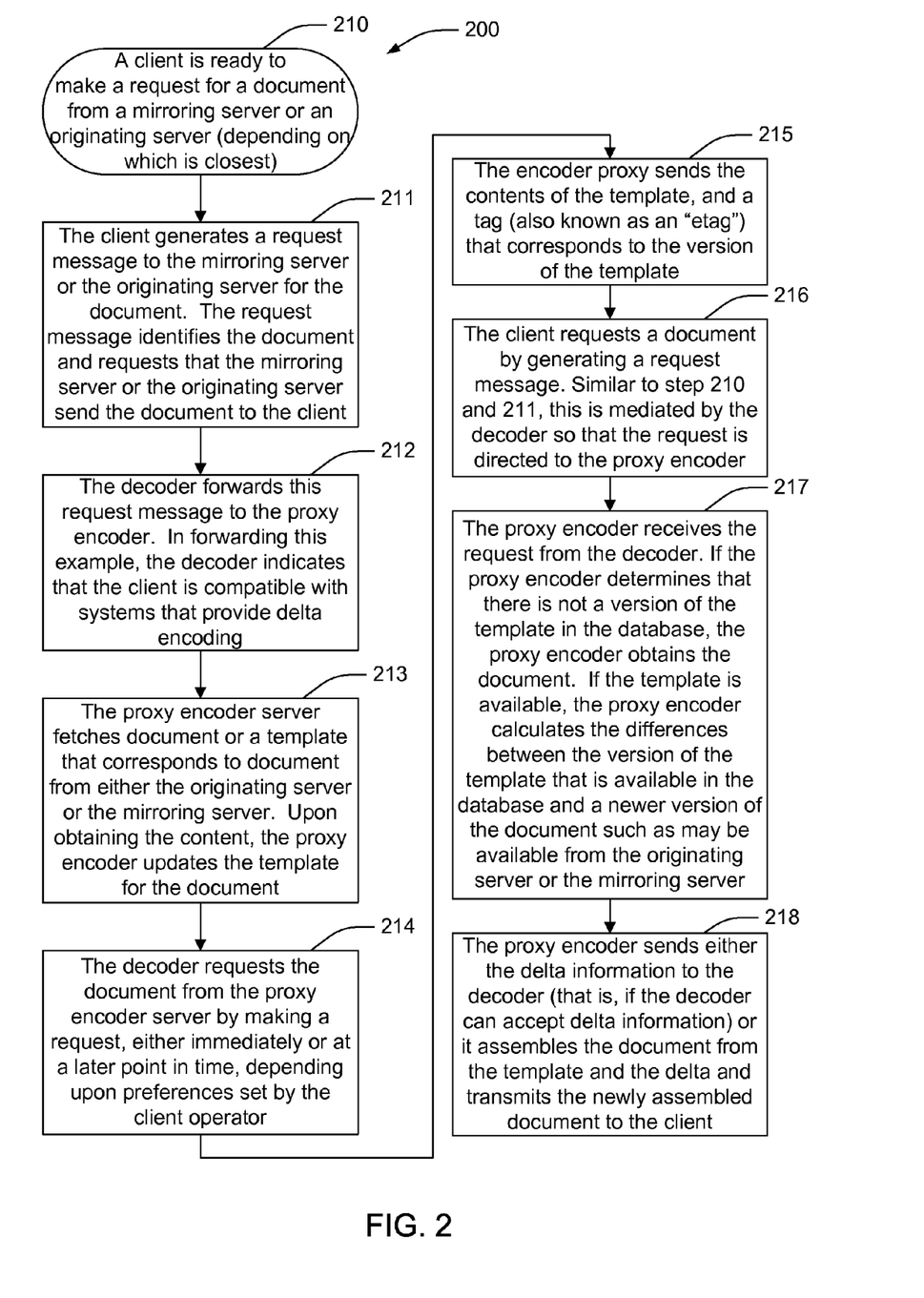
FIG. 2 shows a process flow diagram of a method for operating a content delivery network using a proxy encoder server and one or more decoders.

FIG. 2 shows a process flow diagram for a method of operating a content delivery network using a proxy encoder server and one or more decoders.

A method 200 includes a set of flow points and process steps as described herein.

Although by the nature of textual description, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

At a flow point 210, a client 110 is ready to make a request for a document 123 from a mirroring server 130 or an originating server 120 (depending upon which is closest). In a preferred embodiment, each request for a document 123 is performed independently, even if a plurality of requests are to be performed substantially simultaneously.

At a step 211, the client 110 generates a request message 151 to the mirroring server 130 or the originating server 120 for the document 123. The request message 151 identifies the document 123 and requests that the mirroring server 130 or the originating server 120 send the document 123 to the client 110. In a preferred embodiment, the request message 151 is made using the decoder 114, preferably on the client's web browser 113.

In a step 212, the decoder 114 forwards this request message 151 to the proxy encoder 140, situated preferably near the mirroring server 130 or the originating server 120. In forwarding this request, the decoder 114 indicates that the sender, (that is the client 110) is compatible with systems that provide delta encoding.

In clientless versions (that is, those clients without a decoder 114) the request goes directly to the encoder 140.

In a step 213, the proxy encoder server 140 fetches document 123 or a template 124 that corresponds to document 123 from either the originating server 120 or the mirroring server 130, depending upon which is closest to the proxy encoder 140. Upon obtaining the content, the proxy encoder 140 updates the template 124 for the document 123. In the event that there is not a template 124 associated with document 123, the proxy encoder 140 generates a template 124 and caches it.

In clientless embodiments, the proxy encoder 140 responds directly with the delta information. In such embodiments, the delta is an HTML page that includes a reference to a template (for example, a Javascript) and a delta (for example, some Javascript instructions). In this embodiment, the Javascript instructions comprising the delta tell the browser how to transform the template into the correct HTML or XML document.

In a step 214, the decoder 114 requests the template 124 from either the proxy encoder server 140 or the mirroring server 130, (depending where the encoder proxy 140 specified the template 124 was cached in the previous step, either immediately or at a later point in time, depending upon preferences set by the client operator 112.

In the clientless version, the browser 113 automatically and immediately retrieves the template from the site specified in the previous step.

In a step 215, the encoder proxy 140 sends the contents of the template 124, and a tag (also known as an "Etag") that corresponds to the version of the template. The encoder marks the template as being cacheable by network elements such as the mirroring servers 130, the client 110, the decoder 114 or public caches such as HTTP proxy caches.

If the contents and etag are sent from the mirroring server 130, then the mirroring server 130 searches its cache for the template 124. If the template 124 is present in its cache, the mirroring server 130 sends the template 124 directly to the client 110. If the template 124 is not present in the cache, the mirroring server 130 automatically fetches the template 124 from the encoder proxy 140, caches the fetched template 124, and sends the template to the client 110.

The following steps occur when the user subsequently requests the document 123.

In a step 216, the same or a different client 110 requests a document 123 by generating a request message 151. Similar to step 210 and 211, this is mediated by the decoder 114 so that the request is directed to the proxy encoder 140. Continuing with the example, the decoder 114 changes the original request to as to further specify a version number that is used to ascertain if changes have occurred.

In a step 217, the proxy encoder 140 receives the request from the decoder 114. If the proxy encoder 140 determines that there is not a version of the template 124 in the database 142, the proxy encoder 140 obtains the document 123 from either the originating server 120 or the mirroring server 130 as in steps 213-215 and caches the template. If, however, the template 124 is available, the proxy encoder 140 calculates the differences between the version of template 124 that is available in the database 142 and a newer version of the document 123 such as may be available from the originating server 120 or the mirroring server 130. These differences are the delta information 125.

In a step 218, the proxy encoder 140 may send either the delta information 125 to the decoder 114 (that is, if the decoder 114 can accept delta information 125) or it sends the document 123 to the client.

Steps 216 through 218 are described with respect to a client-server implementation. In the clientless version, the proxy encoder server 140 does not need to know which version of the template 124 is at the client 110. This information is not needed because the proxy encoder server 140 makes this decision a priori and instructs the client 110 to use a specific version of the template 124. Under these circumstances, steps 216-218 in the clientless version are comparable to step 210 through 215 in which the browser 113 (rather than the decoder 114) makes a request that is directed to the encoder proxy 140.

Figure 3:
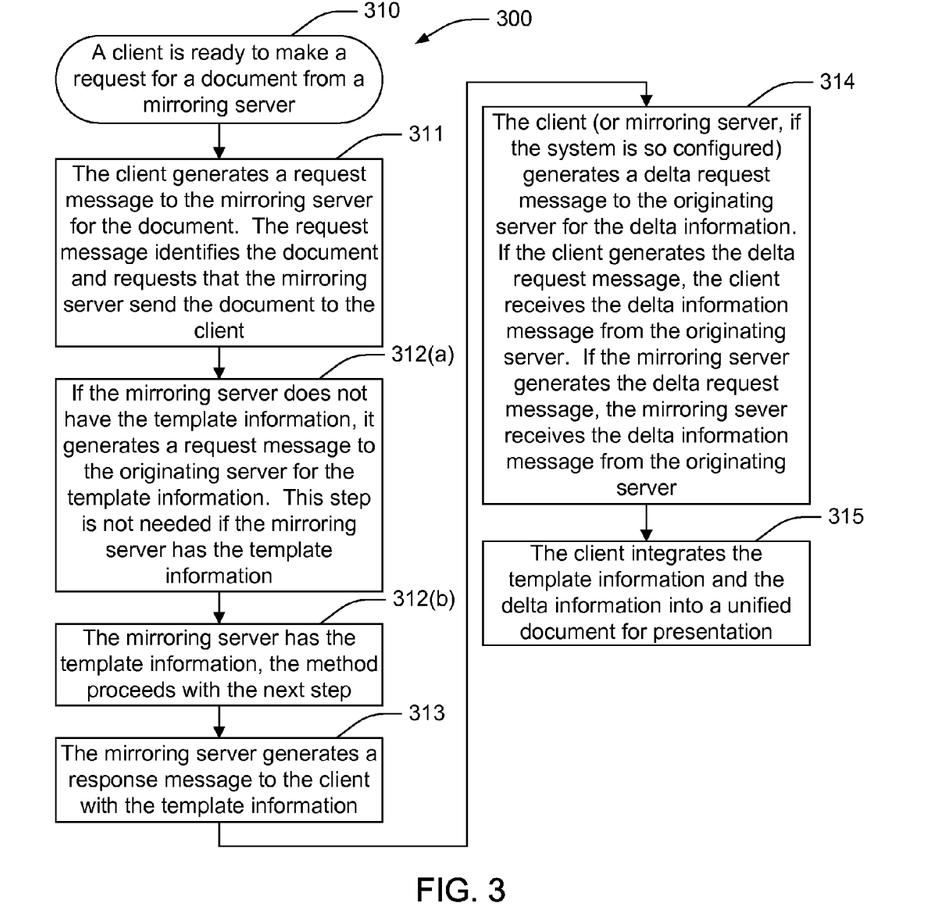
FIG. 3 shows a process flow diagram for a method of operating a content delivery network using differential caching.

FIG. 3 shows a process flow diagram for a method of operating a content delivery network using differential caching.

A method 300 includes a set of flow points and process steps as described herein.

Similar to method 200, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

At a flow point 310, a client 110 is ready to make a request for a document 123 from a mirroring server 130. In a preferred embodiment, each request for a document 123 is performed independently, even if a plurality of requests are to be performed substantially simultaneously.

At a step 311, the client 110 generates a request message 151 (shown in FIG. 1) to the mirroring server 130 for the document 123. The request message 151 identifies the document 123 and requests that the mirroring server 130 send the document 123 to the client 110.

At a step 312, the mirroring server 130 determines if it has template information 124 for the requested document 123. To perform this step, the mirroring server 130 performs one the following sub-steps:

At a sub-step 312(a), if the mirroring server 130 does not have the template information 124, it generates a request message 152 (shown in FIG. 1) to the originating server 120 for the template information 124. As part of this sub-step, upon receiving the template information 124, the mirroring server 130 records the template information 124 in a cache relatively local to the mirroring server 130.

At a sub-step 312(b), the mirroring server 130 has the template information 124, the method proceeds with the next step.

At a step 313, the mirroring server 130 generates a response message 153 (shown in FIG. 1) to the client 110 with the template information 124.

At a step 314, the client 110 (or the mirroring server 130, if the system is so configured) generates a delta request message 154 to the originating server 120 for the delta information 125. As part of this step, the system performs one of the following sub-steps:

At a sub-step 314(a), if the client 110 generates the delta request message 154, the client 110 receives the delta information message 155 from the originating server 120

At a sub-step 314(b), if the mirroring server 130 generates the delta request message 154, the mirroring server 130 receives the delta information message 155 from the originating server 120. As part of this sub-step, the mirroring server 130 forwards the delta information 125 in a second delta information message 155 to the client 110.

At a step 315, the client 110 integrates the template information 124 and the delta information 125 into a unified document 123 for presentation. Integration of the template information 124 and the delta information 125 is further described in the incorporated disclosures.

Generality of the Invention

The invention has general applicability to content delivery, not limited specifically to the web pages, web protocols, or caching (and not limited specifically to content delivery as described herein). For example, embodiments of the invention can include one or more of, or some combination of, the following applications:

distribution of databases responses, including responses to common or frequently used database queries; and distribution of email and groupware messages, bulletin board or newsgroup messages.

Moreover, techniques used by a preferred embodiment of the invention for content delivery can be used in contexts other than the specific applications disclosed herein. For example, techniques used by embodiments of the invention for content delivery are all generally applicable to fields other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

What is claimed is:

1. A method for delivering content on a network using differential caching, comprising steps of:

receiving a request for information through the network from a request-generating element coupled to a browser within a client workstation;

identifying a static portion and a dynamic portion of a document to be included in a response as the requested information based on previously cached information by utilizing a software element, the previously cached information being stored in a memory within a physical device other than the client workstation;

caching the static portion in the memory such that the cached static portion is logically local to the request-generating element that requested the information;

serving the cached static portion to the request-generating element from the memory;

serving the dynamic portion to the request-generating element from the network; and integrating the static portion and the dynamic portion using the request-generating element into the document included in the response to the browser as the requested information.

2. The method of claim 1 wherein the request is selected from a group consisting of: a request for a web page, a request for information from a database, a request for streaming media, and a request for email.

3. The method of claim 1 wherein the receiving step comprises the request-generating element redirecting the request to the software element.

4. The method of claim 1 wherein the software element utilized in the identifying step is logically local to an original provider of the information.

5. The method of claim 1 wherein the caching step includes caching a tag having information concerning a version associated with the static portion.

6. The method of claim 1 further comprises a step of comparing a version of the static information to other versions of the static information.

7. The method of claim 1 wherein the software element utilized in the identifying step is integrated inside an existing server component selected from a group consisting of: a proxy encoder server, a mirroring server, a web server, an application server, a cache, and an L7 switch.

8. The method of claim 1 wherein the browser and the request-generating element are operatively configured within client workstation.

9. A content delivery network system, comprising:

a proxy server operatively configured to respond to a request-generating element originated request for information from a network server by identifying a static portion and a dynamic portion of a document to be included in a response as the requested information, identifying different versions of the information based on previously cached information stored in a memory of the proxy server, differentially caching the static portion in the memory, and serving the static portion from the memory to the request-generating element; and a network server including the information and operatively configured to respond to the request by serving the dynamic portion to the request-generating element such that the request-generating element may integrate the static portion and the dynamic portion into the document included in the response as the requested information.

10. The system of claim 9 wherein the request-generating element comprises a software agent that redirects the request to the proxy server.

11. The system of claim 9 wherein the request is selected from a group consisting of: a request for a web page, a request for information from a database, a request for streaming media, and a request for email.

12. The system of claim 9 wherein the proxy server is logically local to the original provider of the information.

13. The system of claim 9 wherein the proxy server is configured to generate a tag having information concerning a version associated with the static portion.

14. The system of claim 9 further comprising a client device comprising a browser operatively coupled to the request-generating element, the request-generating element being operatively configured to generate the request for information.

15. The system of claim 9 wherein the proxy server is operatively configured to obtain the requested information from the network server.

16. The system of claim 9 wherein functionality of the proxy server is integrated inside an existing server component selected from a group consisting of: a mirroring server, a web server, an application server, a cache, and an L7 switch.

17. A memory within a content delivery network server storing information, including instructions which are executed by a processor to perform steps comprising:
   recognizing a request for information to a first server from a browser;
   redirecting the request to a proxy server other than the first server;
   receiving a static portion of a document to be included in a response as the requested information from a cache in the proxy server;
   receiving a dynamic portion of the document to be included in the response as the information from the first server, the dynamic portion being determined based on the static portion in the cache;
   integrating the static portion and the dynamic portion in the memory within the content delivery network into the document; and
   presenting the document in the response to the browser through the content delivery network.

18. The memory of claim 17 wherein the memory is logically local to the browser.

19. The memory of claim 17 wherein the proxy server is included in a content delivery network.

20. The memory of claim 17 wherein the request is selected from a group consisting of: a request for a web page, a request for information from a database, a request for streaming media, and a request for email.

21. The memory of claim 17 wherein functionality of the proxy server is integrated inside an existing server component selected from a group consisting of: a mirroring server, a web server, an application server, a cache, and an L7 switch.

22. The memory of claim 17 wherein the browser and the request-generating element are operatively configured within client workstation.

* * * * *